July 31, 1956  E. D. SMITH  2,757,294
DIESEL-ELECTRIC VEHICLE AND CENTERING DEVICE
Filed Oct. 29, 1953  2 Sheets-Sheet 1

INVENTOR
Earl D. Smith
BY
S. E. Thorpe
ATTORNEY

July 31, 1956    E. D. SMITH    2,757,294
DIESEL-ELECTRIC VEHICLE AND CENTERING DEVICE
Filed Oct. 29, 1953    2 Sheets-Sheet 2
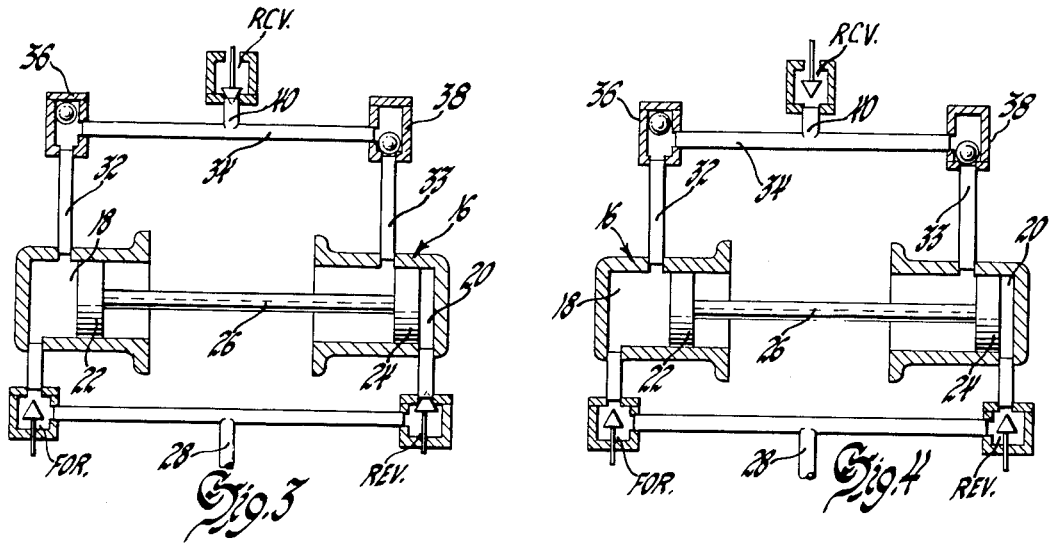
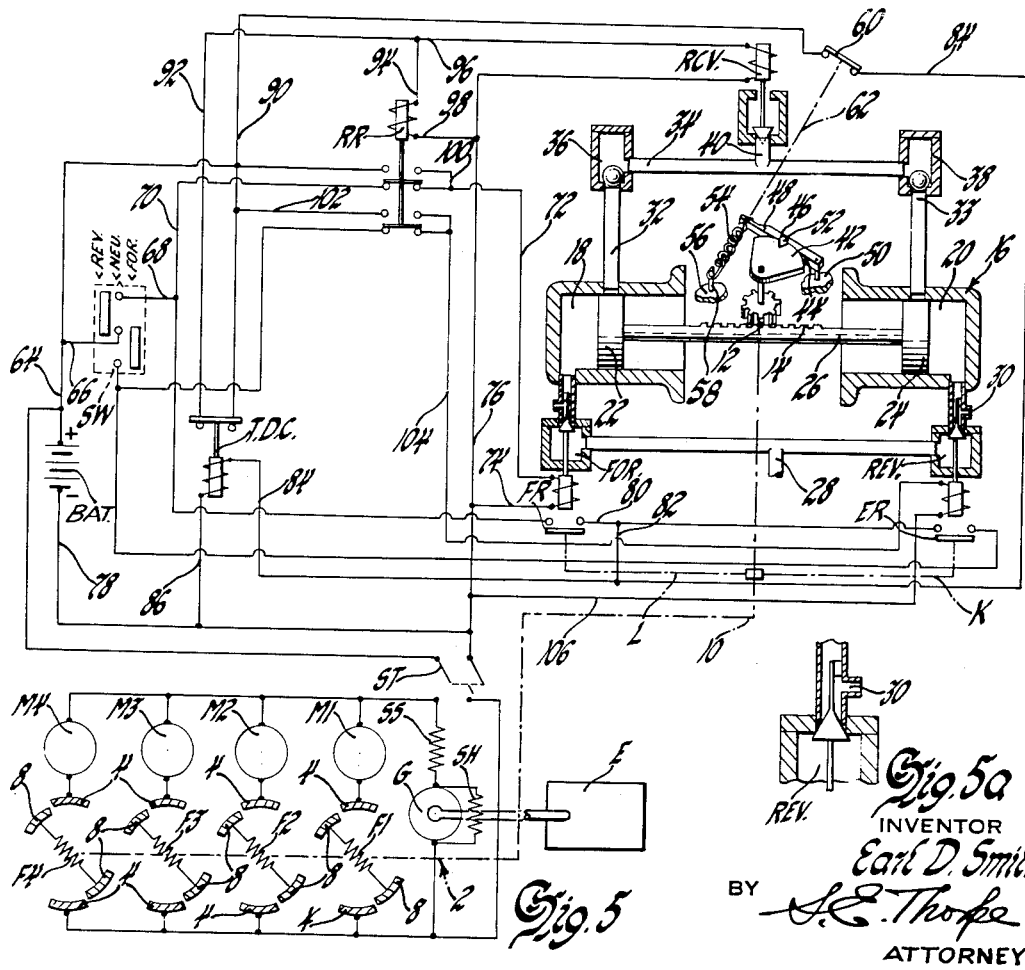
INVENTOR
Earl D. Smith
BY
S. E. Thorpe
ATTORNEY United States Patent Office 2,757,294
Patented July 31, 1956

2,757,294

DIESEL-ELECTRIC VEHICLE AND CENTERING DEVICE

Earl D. Smith, La Grange, Ill., assignor to General Motors Corporation, Detroit, Mich., a corporation of Delaware Application October 29, 1953, Serial No. 389,039

7 Claims. (Cl. 290—10)

This invention generally relates to electro-pneumatically operated devices. The invention, however, is more particularly concerned with electro-pneumatical devices in the field of electro-motive power. Specifically, it is concerned with the problem of using the reverser of a diesel electric locomotive to disconnect the traction motors from the main generator so that the main generator may be used to crank the diesel engine without energy being supplied to the traction motors which would otherwise propel the locomotive along the track.

In starting the diesel engine of a diesel electric locomotive it is common practice to connect the main generator across a constant source of voltage such as a battery and use it as a cranking motor. The generator, however, is normally connected to a plurality of electrical traction motors which supply the propelling power to the wheels of the locomotive. It is quite evident that unless some means is provided to isolate these motors from the generator when the generator is being used to start the diesel engine power will also be supplied to the motors causing the locomotive to be propelled along the track. Several methods have been proposed for isolating these motors from the generator during starting. These methods, however, require a substantial number of large, heavy current switches and means for operating the switches, all of which take up extra space, are subject to frequent failure and replacement and generally are quite costly. One way of avoiding these objections would be to provide some simple means which might be combined with existing heavy current equipment to accomplish the desired result.

It is common practice to provide each locomotive with a heavy current, multiple pole, double throw switch known in the art as a "reverser." This reverser is used to reverse the polarity of the traction motor fields and thereby the direction of rotation of the traction motors. Since the reverser is usually considered a necessary component of a diesel electric locomotive and acts in series with the traction motors and the main generator, the present invention is proposed to use this reverser to isolate the traction motors from the generator during starting of the diesel engine by providing it with a new operating position between its normal operating positions of forward and reverse. A reverser, however, is a very heavy switch and requires considerable power to operate it. Since the ordinary solenoid is not satisfactory to operate this type of switch, it is usually provided with a pneumatic, or other, type of pressure operated servomotor normally having two operating positions corresponding, in this case, to forward and reverse. In a broad sense what is actually proposed then is to modify this pneumatic or pressure operated servo-means so that instead of the usual two operating positions it will have a third or intermediate operating position in which it will render the reverser ineffective to electrically connect the traction motors to the main generator.

It is, therefore, broadly an object of this invention to provide means for centering the operating means of a pressure operated device intermediate a pair of normal operating positions.

It is a further object of this invention to provide means for yieldably retaining the operating means of a servomotor centered intermediate a pair of normal operating positions so that means for centering the operating means intermediate its normal operating positions can be deenergized.

It is a further object of this invention to provide means in combination with the reverser of a diesel electric locomotive which will enable the reverser to be centered intermediate its forward and reverse positions so that the diesel engine of the locomotive may be started with the main generator as a cranking motor without supplying power to the locomotive traction motors.

For a further understanding of this invention reference may be had to the accompanying detailed description and drawings, in which:

Fig. 3 is a schematic of the servomotor for operating the reverser with the new centering means attached thereto and shows the servomotor in the normal forward position.

Fig. 4 is a second schematic showing the servomotor in the forward position but about to be centered between the forward and reverse positions.

Fig. 5 is a schematic diagram of the whole generator and traction motor system including the reverser and the servomotor for operating the reverser in combination with a novel electrical control which remotely controls the forward, reverse and new centering operations thereof.

Fig. 5a illustrates that when the forward and reverse valves which connect the servomotor with a suitable pressure source are closed they connect the pressure chambers of the servomotor with the atmosphere.

Referring first to Fig. 5, the power plant of a diesel electric locomotive is shown as generally comprising a diesel engine E operably coupled to a compound main generator G. The generator G is excited by series and shunt windings SS and SH, respectively, and provides power for four traction motors M1, M2, M3 and M4, in this case shown connected in parallel thereacross. The traction motors M1 through M4 are provided with suitable field windings F1, F2, F3 and F4, respectively, and have their armature and field leads connected to contact assemblies 4 and busses 8 of a four motor reverser 2 so that the polarities of fields F1 through F4 may be reversed by turning the reverser shaft 10 through a predetermined angle.

Figure 1:
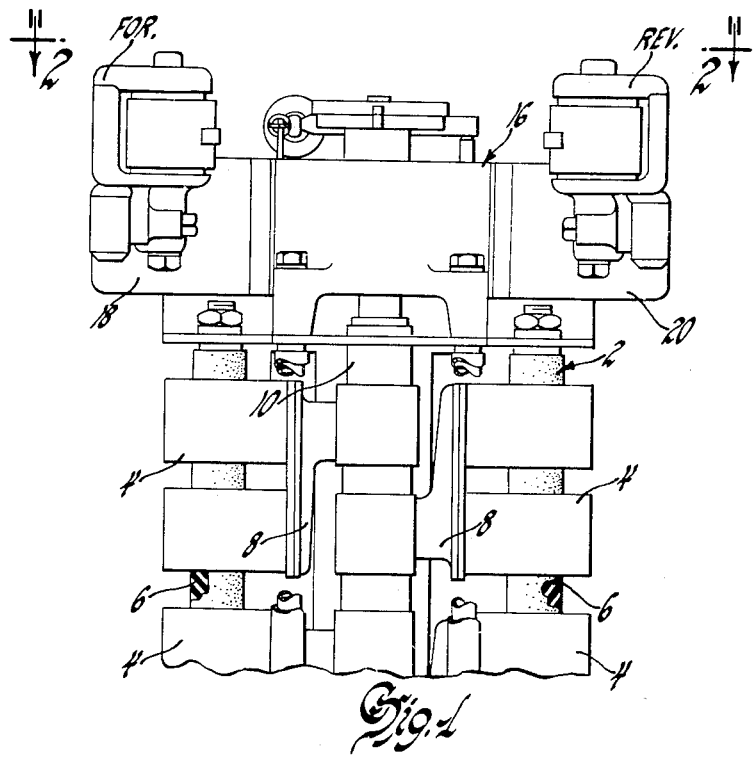
Fig. 1 is a front view in elevation of part of a reverser as used on diesel electric locomotives including its electro-pneumatic operating means with a portion of the new centering means mounted at the top thereof.
Figure 2:
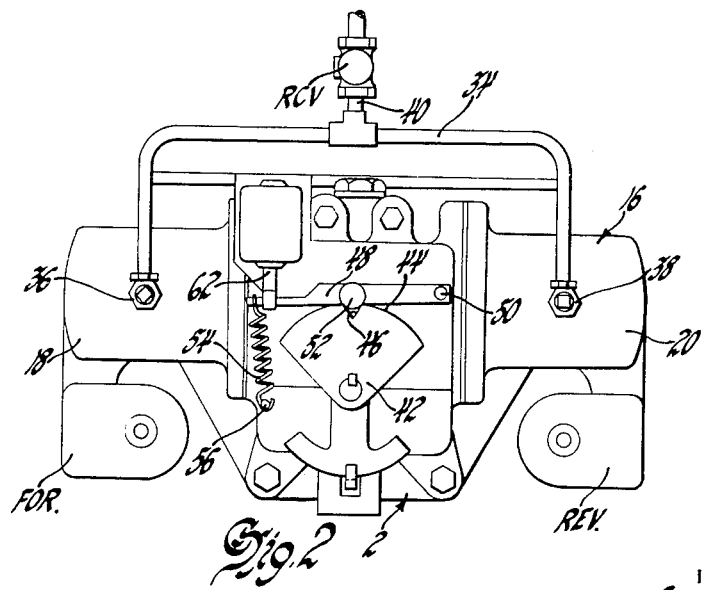
Fig. 2 is a top view of the reverser taken on the line 2—2 of Fig. 1 and in addition to the servo-means shows in detail the detent means for maintaining the reverser centered.

The reverser 2 is only diagrammatically represented in Fig. 5 and is best illustrated in Fig. 1 which shows a portion of a reverser of the type currently used on diesel electric locomotives. The reverser 2 includes a plurality of the aforementioned stationary contact assemblies 4 mounted on vertical insulated bars 6. As has already been described, these contact assemblies are connected to the locomotive traction motor leads and may be connected in vertical or horizontal combinations by the busses 8 secured to the insulated rotatable shaft 10 to change the polarity of the traction motor fields. The shaft 10 carries a pinion 12 (see Fig. 5) at its upper end which is engageable with a rack 14 forming a part of the operating means of a servomotor indicated generally in the figures by the numeral 16. The servomotor 16 is energized by a pair of oppositely disposed solenoid or relay operated valves commonly known as air magnet valves which have been designated herein FOR and REV to indicate that one is energized for forward operation of the reverser and the other is energized for reverse operation of the reverser.

In Figures 3 through 5 it will be observed that the servomotor 16 includes a pair of oppositely disposed pressure chambers 18 and 20 including pistons 22 and 24 movable therein. The pistons 22 and 24 are interconnected by means of a rod 26 which includes the aforementioned rack 14. Air may be supplied to chambers 18 and 20, respectively, by the air magnet valves FOR and REV which are connected to a suitable air pressure source (not shown) by piping 28. Schematic details for the air magnet valve REV are shown in Fig. 5a to illustrate that when the valve REV is closed a port 30 is opened to connect chamber 20 to the atmosphere. Air magnet valve FOR is provided with similar means to connect the chamber 18 with atmosphere when valve FOR is closed.

The new means for centering the reverser so that the movable contact busses 8 do not engage the stationary contact assemblies 4 and the motors M1 through M4 are disconnected from the generator G includes passageways or conduits 32 and 33 connected by one-way ball valves 36 and 38 to a conduit 34. The conduits 32 and 33 communicate at their lower ends with the chambers 18 and 20, respectively, but are closed off when the interconnected pistons 22 and 24 are centered intermediate the forward and reverse operating positions. The passageway 34 is provided with a communicating passageway 40 which is normally maintained closed by means of a de-energized solenoid operated or air magnet valve RCV.

To maintain the interconnected piston assembly centered intermediate the forward and reverse positions the shaft 10 extends upwardly above the pinion 12 and is provided at its upper end with a cam plate 42 having a curved cam surface 44 which is notched as at 46. An operating switch arm 48 is pivotally supported on the servomotor 16 at 50 and is provided with an operating pin 52 which is maintained against the surface 44 by means of a spring 54 connected to the arm 48 and anchored to the servomotor 16 as at 56. Pin 58 is engageable in the notch 46 when the operating means of the servomotor is centered. It will be noted that lever 48 is connected to an interlock 60 by means of a link 62 and that interlock 60 is closed when pin 52 resides in notch 46. In order to operate the air magnet valves FOR, REV and RCV, a battery BAT and a drum switch SW are provided in combination with a novel electrical control circuit. The drum switch SW is provided with three positions; a reverse position, neutral or centering position, and a forward position. In order to complete the electrical control, a relay RR, a time delay relay TDC and a switch ST for connecting battery BAT to the main generator are provided.

The operation of this reverser and its centering means is as follows: With the switch SW in the forward position, the FOR valve, which is a solenoid operated valve, will be energized and will open thereby supplying air under pressure to the chamber 18 causing the pistons 22 and 24, the interconnecting rod 26 and the rack 14 to move to the right or forward operating position. See Figure 3. Movement of the rack 14 to the forward operating position will cause the switching contacts 4 and 8 of the reverser to connect the traction motors M1 through M4 across the generator so that the locomotive will be propelled in the forward direction. Similarly, if the switch SW is moved to the position REV the valve REV will be energized and the valve FOR will be de-energized causing the pistons 22, 24 and the rack 14 to move to the left as indicated in the drawing. Movement of the rack 14 to its extreme left hand operating position, of course, rotates the shaft 10 and reverses the polarity of the fields of the traction motors so that the locomotive will be propelled in the reverse direction. It will be noted, however, that with the pistons 22 and 24 alternately in the forward or the reverse positions air under pressure can alternately enter through the conduits 32 and 33 and valves 36 and 38 to conduit 34. The pressure is contained in the conduit 34, however, because the RCV valve is normally closed and the ball valves 36 and 38 allow air to flow in only one direction. Assuming the reverser to be in the forward position so that the pistons, valves, etc., are in positions shown in Fig. 3 when it is desired to crank the diesel E, the switch SW is moved to its neutral position. Movement of the switch SW to its neutral position energizes the valves FOR, REV and RCV as indicated in Fig. 4. Energization of all three of these valves relieves the higher pressure in chamber 18 through the conduit 32, valve 36, conduit 34, and the now open RCV valve so that the interconnected pistons 22 and 24 begin moving to the left. As the pistons move to the left, however, passageway 32 communicating with the chamber 18 begins to close causing the pressure in the chamber 18 to increase. If the piston 24 should move to the left too far the passageway 32 communicating chamber 20 will be uncovered thereby relieving the increasing pressure in chamber 20 by means of conduit 33, valve 38, conduit 34, and the now open valve RCV. It will be readily observed that with the valves REV, FOR and RCV open any movement of the pistons 22 and 24 from their intermediate or centered positions will uncover the passages 32 and 33 and create an unbalance of pressure in the chambers 18 and 20 which tends to return the pistons 22 and 24 to their centered position. When the pistons 22 and 24 are moved to their centered position the rack 14 causes the reverser switch to also move to its intermediate or center position thereby disconnecting the traction motors M1–M4 from the generator G.

Since the cam plate 42 is connected to the shaft 10 it will also be moved to an intermediate position and will allow the pin 52 to move into the notch 46. Because of the spring 54, movement of the pin 52 into the notch 46 allows the arm 48 to swing about its pivot point so that the interlock 60 closes. Closure of the interlock 60 de-energizes the FOR, REV and RCV valves so that no further energy is consumed thereby. The detent means comprising spring 54, the notch in the cam plate 42 and the pin 52 is sufficient to maintain the reverser in the centered position as long as no high pressure air is supplied alternately to chambers 18 or 20.

With the reverser in its centered position the starting switch ST may be closed to connect the generator G to the battery BAT so that the generator may be utilized as a cranking motor to start the engine E. Once the diesel is started the starting switch ST may be opened so that the generator G will cease to function as a motor and may act as a generator. Naturally, as soon as the diesel engine E has been started and it is desired to propel the locomotive in either the forward or reverse directions, the traction motors M1 through M4 must be connected to the generator G. This may be accomplished by moving the switch SW to the forward position. Movement of the switch SW to the forward position will again energize only valve FOR. The pressure which will be supplied to the chamber 18 as a result of opening valve FOR is sufficient to overcome the aforementioned detent means and the interconnected pistons 22 and 24 including the rack 14 will be moved to the right thereby operating the reverser so that traction motors M1–M4 will be connected across generator G to propel the locomotive in a forward direction.

The novel circuit which in combination with the new centering means accomplishes the centering operation described above operates as follows: With the switch SW in the position FOR, current may be supplied from the positive side of the battery BAT through conductors 64 and 66, the now closed upper and middle contacts of the switch SW, conductors 68 and 70, the normally closed lower contacts of the upper interlock of the RR relay, a conductor 72, the energizing coil of the FOR valve and conductors 74, 76 and 78, returning to the negative side of the battery BAT. As already described, energization of the valve FOR will supply air under pressure to the chamber 18 causing the pinion 12 and the rack 14 to connect the traction motors M1–M4 across the generator for forward operation of the locomotive. It will be observed also that energization of the valve FOR to turn shaft 10 to the forward position closes an interlock FR attached thereto by a suitable link L. Closure of this interlock FR energizes the coil of the time delay relay TDC by current flow from the positive side of battery BAT through conductors 64 and 66, the now closed upper and middle contacts of the switches SW, conductor 70, the now closed interlock FR, conductors 80, 82 and 84, the energizing coil of the TDC relay and conductors 86 and 78, returning to the negative side of the battery BAT. Energization of the TDC relay opens its interlock and prevents energization of the valve RCV and the RR relay. Reverse operation is accomplished in a similar manner and similarly an interlock ER attached to shaft 10 by a link K energizes the TDC relay when the reverser is in the reverse position.

Now, should it be decided to center the reverser so that the engine E may be started by means of the generator G without supplying power to the traction motors M1–M4, the switch SW is moved to the neutral or centering position NEU. Movement of the switch SW to its neutral or center position opens all of its contacts. Opening of the contacts of the SW switch will de-energize the valve FOR and, of course, de-energize the TDC relay causing its interlock to close. With the TDC interlock closed, the energizing coils of the valve RCV and the RR relay will be energized. This may be observed by tracing out the energizing circuits for the valve RCV and the RR relay which include the positive side of the battery BAT, conductor 64, a conductor 90, the now closed interlock of the TDC relay, a conductor 92, conductors 94 and 96, the energizing coils of the valve RCV and the RR relay, conductors 98 and 76, returning to the negative side of the battery BAT by means of conductor 78. Energization of the energizing coil of the RR relay causes the normally closed lower contacts of the upper interlock and the normally open upper contacts of the upper interlock to close. It also causes the RR relay normally closed lower contacts of the lower interlock to open and the normally open upper contacts of the lower interlock to close. Closure of the upper contacts of the upper interlock and the upper contacts of the lower interlock of the RR relay energizes the valves FOR and REV. The circuit for energizing the relay FOR with the switch SW in the neutral position includes the positive side of the battery BAT, conductor 64, the now closed upper contacts of the upper interlock of the RR relay, conductor 100, conductor 72, the energizing coil of the valve FOR and conductors 74, 76 and 78, returning to the negative side of the battery BAT. The valve REV is energized with the switch SW in the neutral position by a circuit including the positive side of the battery BAT, conductors 64 and 90, a conductor 102, the now closed upper contacts of the lower interlock of the RR relay, conductor 104, the energizing coil of the valve REV, a conductor 106 and conductors 76 and 78, returning to the negative side of the battery BAT. With the valves FOR, RCV and REV all energized the reverser centering means will center the reverser and disconnect the traction motors from the main generator as described above. As soon as the reverser has been centered so that the pin 52 is engaged in the notch 46 the interlock 60 will be closed. As already stated, closure of the interlock 60 de-energizes the energizing coils of the valves FOR, REV and RCV. This is accomplished in the following manner: With the interlock 60 now closed current can flow from the positive side of the battery BAT through conductor 64, conductor 99, the now closed interlock 60, the conductor 84, the energizing coil of the TDC relay and conductors 86 and 78, returning to the negative side of the battery BAT. Energization of the TDC relay, of course, opens its interlock thereby de-energizing the valve RCV and the RR relay. De-energization of the operating coil of the valve RCV causes it to close. De-energization of the energizing coils of the RR relay causes its interlocks to drop to their lower positions thereby disconnecting the energizing coils of the FOR and REV valves from the battery BAT.

It may now be appreciated that this unique but unusually simplified reverser centering means primarily utilizes existing locomotive equipment thereby avoiding the necessity of adding separate heavy current switches to disconnect the traction motors from the main generator of a diesel electric locomotive during cranking of the diesel by means of the main generator. Additionally, it avoids continued energization of the new centering means once the reverser has been centered by providing novel detent means which yieldingly maintain the reverser centered during starting of the diesel. It is also extremely simple to operate and may be remotely controlled from any desired location on the locomotive.

I claim:

1. In a diesel electric locomotive including a diesel engine and a generator coupled thereto, a traction motor, a switch having operating positions for connecting said motor to said generator for forward and reverse movement of said vehicle, a servomotor having operating means connected to said switch and movable to a plurality of operating positions, means to center said operating means intermediate said plurality of operating positions and detent means for yieldingly holding said operating means in said intermediate position so that said generator may be used to crank said engine without supplying power to said motor.

2. In a diesel electric locomotive including a diesel engine and a generator coupled thereto, a traction motor, a switch having operating positions for connecting said motor to said generator for forward and reverse movement of said vehicle, a servomotor having operating means connected to said switch and movable to a plurality of operating positions corresponding to the operating positions of said switch, and means to center said operating means intermediate said plurality of operating positions so that said generator may be used as a cranking motor to start said engine without supplying power to said motor comprising oppositely disposed pressure chambers, pistons in said chambers movable back and forth to said operating positions in response to pressures supplied thereto, a rack interconnecting said pistons, a pinion engageable with said rack and operatively connected to said switch, valve means associated with each of said chambers and connected to a pressure source, each of said valve means being individually operable to supply pressure to its associated chamber, fluid conducting conduits communicating with said chambers and closable by said pistons when centered intermediate said operating positions, valve means connected to said conduits and operable to relieve the pressures therein, electrical valve operating means to effect opening of all of said valve means whereby the resultants of the pressures in said chamber are equalized when said pistons are centered intermediate said operating positions, a cam plate operatively connected to said switch and turnable by said pinion, detent means for yieldingly holding said cam plate when said switch is in said intermediate position, a voltage source, an interlocking switch operatively connected to said detent means and in series electrical circuit with said voltage source and said electrical valve operating means, said interlocking switch being operable by said detent means when said interconnected pistons are in said intermediate position to de-energize said electrical valve operating means.

3. In combination with a servomotor including oppositely disposed pressure chambers and interconnected pistons movable in said chambers to a plurality of operating positions in response to pressures supplied thereto; a valve means associated with each of said chambers and connected to a pressure source, each of said valve means being individually operable to supply pressure to its associated chamber; means to center said interconnected pistons intermediate said operating positions comprising passageways communicating with said chambers, said passages being closed by said pistons when centered intermediate said operating positions, valve means operable to relieve the pressures in said passages and valve operating means to effect opening of said valve means whereby the resultants of the pressures in said chambers are equalized when said interconnected pistons are centered intermediate said operating positions.

4. The combination of a servomotor having operating means movable to a plurality of operating positions, means to center said operating means intermediate said plurality of operating positions and detent means for yieldingly holding said operating means in said intermediate position comprising oppositely disposed pressure chambers, interconnected pistons in said chambers movable back and forth to said operating positions in response to the pressures supplied thereto, a valve means associated with each of said chambers and connected to a pressure source, each of said valve means being individually operable to supply pressure to its associated chamber, fluid conducting conduits communicating with said chambers, and said conduits being closed by said pistons when centered intermediate said operating positions, valve means connected to said conduits and operable to relieve the pressures therein, valve operating means to effect opening of all of said valve means whereby the resultants of the pressures in said chambers are equalized when said pistons are centered intermediate said operating positions, a cam plate operatively connected to said interconnected pistons and a resiliently loaded member engageable with and yieldingly restraining said cam plate against movement when said pistons are in said intermediate position.

5. In a vehicle including an engine and a generator coupled thereto, a traction motor, a switch having operating positions for connecting said motor to said generator for forward and reverse movement of said vehicle, a servomotor having operating means connected to said switch and movable to a plurality of operating positions corresponding to the operating positions of said switch, and means to center said operating means intermediate said plurality of operating positions so that said generator may be used as a cranking motor to start said engine without supplying power to said motor.

6. In a vehicle including an engine and a generator coupled thereto, a traction motor, a switch having operating positions for connecting said motor to said generator for forward and reverse movement of said vehicle, a servomotor having operating means connected to said switch and movable to a plurality of operating positions corresponding to the operating positions of said switch, means energizable to center said operating means intermediate said plurality of said operating positions, detent means for yieldingly holding said operating means in said intermediate position so that said generator may be used as a cranking motor to start said cranking engine without supplying power to said motor, and means operable by said detent means when said operating means is in said intermediate position to de-energize said means energizable to center said operating means.

7. The combination of a servomotor having operating means movable to a plurality of operating positions and means to center said operating means intermediate said plurality of operating positions comprising oppositely disposed pressure chambers, interconnected pistons in said chambers movable back and forth to said operating positions in response to pressures supplied thereto, a valve means associated with each of said chambers and connected to a pressure source, each of said valve means being individually operable to supply pressure to its associated chamber, fluid conducting conduits communicating with said chambers, said passages being closed by said pistons when centered intermediate said operating positions, valve means connected to said conduits and operable to relieve the pressures in said conduits, and valve operating means to effect opening of all of said valve means whereby the resultants of the pressures in said chambers are equalized when said pistons are centered intermediate said operating positions.

References Cited in the file of this patent
UNITED STATES PATENTS

| Number | Name | Date |
|---|---|---|
| 475,702 | Patton | May 24, 1892 |
| 1,009,664 | Hefty | Nov. 21, 1911 |
| 1,175,377 | Pearson | Mar. 14, 1916 |
| 1,196,713 | Nelson | Aug. 29, 1916 |
| 1,275,201 | Beach | Aug. 13, 1918 |
| 1,509,160 | Mahony et al. | Sept. 23, 1924 |
| 2,099,422 | Farmer | Nov. 16, 1937 |
| 2,279,365 | Cameron | Apr. 14, 1942 |
| 2,314,444 | Crittenden | Mar. 23, 1943 |
| 2,582,570 | Terwilleger | Jan. 15, 1952 |